(12) United States Patent
Honda

(10) Patent No.: US 8,817,409 B2
(45) Date of Patent: Aug. 26, 2014

(54) MAGNETIC DATA ERASER

(75) Inventor: Tadashi Honda, Kanagawa-ken (JP)

(73) Assignee: Tadashi Honda, Kanagawa-ken (JP)

( * ) Notice: Subject to any disclaimer, the term of this patent is extended or adjusted under 35 U.S.C. 154(b) by 62 days.

(21) Appl. No.: 13/549,516

(22) Filed: Jul. 15, 2012

(65) Prior Publication Data

US 2013/0329314 A1 Dec. 12, 2013

(30) Foreign Application Priority Data

Jun. 8, 2012 (JP) ................... 2012-130760

(51) Int. Cl.
*G11B 5/024* (2006.01)
*G11B 5/012* (2006.01)

(52) U.S. Cl.
CPC .............. *G11B 5/0245* (2013.01); *G11B 5/012* (2013.01)
USPC .......................................... 360/66; 361/143

(58) Field of Classification Search
CPC ............................... G11B 5/0245; G11B 5/012

USPC ............................................. 361/143; 360/66
See application file for complete search history.

(56) References Cited

U.S. PATENT DOCUMENTS

2007/0014044 A1* 1/2007 Kitamura et al. ............... 360/66
2007/0247776 A1* 10/2007 Tamura et al. ................ 361/149

* cited by examiner

*Primary Examiner* — Scott Bauer
(74) *Attorney, Agent, or Firm* — Lowe Hauptman & Ham LLP

(57) ABSTRACT

The magnetic data eraser includes: a mounting and immobilizing tray on which a magnetic recording medium is mounted, the mounting tray being inclined at an angle of 60±10 degrees to the horizontal; a magnetizer that is encircled by a magnetizing coil, the magnetizer having a hollow portion into which the mounting and immobilizing tray is inserted; and a controller that causes an electric current to flow as an excitation current through the magnetizing coil, the excitation current generating a magnetic field that erases data stored in the magnetic recording medium.

6 Claims, 17 Drawing Sheets

MAGNETIC DATA ERASER

BACKGROUND OF THE INVENTION

1. The Field of the Invention

The present invention relates to a magnetic data eraser that is configured to erase magnetic data stored in a magnetic recording medium such as a hard disk drive (HDD).

2. Description of Prior Art

At the present time, when a magnetic recording medium (hereinafter, exemplified by a hard disk drive) is to be discarded after its use has terminated in an office or by an individual person, in order to conceal the magnetic data stored in the hard disk drive from unrelated persons, the magnetic data contained in said hard disk drive (HDD) is often erased by formatting the HDD using commands from the operating system of the computer in which the hard disk drive is installed.

However, when the above mentioned method is used, the only part of the HDD that is erased is the data management-related portion which is used to manage the handling of magnetic information on the hard disk. The actual magnetic data information itself may remain on the hard disk and may be recoverable. For this reason, other methods have been developed such as, for example, a method for erasing information stored in the magnetic disk drive by applying magnetic force generated by an electromagnet to the magnetic disk drive.

Japanese Laid-Open Patent Application listed in 0005 below discloses an invention related to a data eraser that performs the data erasing process with a simple operation in order to prevent a data leak of magnetic data stored in the magnetic recording medium to be discarded, and in particular discloses an invention relating to a data eraser that performs the data erasing process by applying a horizontal magnetic field from a magnet to the magnetic recording medium.

Japanese Laid-Open Patent Application 2007-66439

However, currently, the perpendicular magnetic recording method has become widely adopted. In perpendicular magnetic recording, the magnetic write field is applied to the magnetic disk drive in a direction perpendicular to the disk's surface in order to store data in the magnetic recording medium. This perpendicular magnetic recording method is considered to be more effective than the in-plane magnetic recording method (or linear magnetic recording method) which was the conventional recording method, including the method disclosed in Japanese Laid-Open Patent Application 2007-66439, because the perpendicular magnetic recording method can provide better performance than the in-plane magnetic recording method, such as providing a higher data recording density.

Hence, when it has been desired to erase data stored in a magnetic disk drive in situations where it is not known whether the recording direction is perpendicular or linear, it has been necessary to operate a data eraser to apply a magnetic field in the direction horizontal to the magnetic disk drive and then further to apply a magnetic field in the direction perpendicular to the magnetic disk drive, or apply a two to three times stronger magnetic field in order to avoid insufficient erasure because of improper direction of the magnetic flux angle.

This has required a longer time and more complex operations to perform the data erasing process and/or more power required for erasing data stored in a magnetic recording medium including media that have been recorded in the perpendicular direction, than in the case of using a conventional data eraser (that is, an eraser for linear recorded media only).

Meanwhile, a method has been proposed for erasing data stored in a magnetic recording medium by applying a magnetic field, wherein the magnetic recording medium such as a magnetic disk device is mounted in a data easer so that the magnetic recording medium is inclined to magnetic flux generated by the data eraser. However, in this method, no suitable value has been proposed for the angle at which the magnetic recording medium is inclined.

SUMMARY OF THE INVENTION

The present invention has been made taking the above mentioned problems into consideration, and an object of the present invention is to provide a magnetic data eraser (or a magnetizing apparatus or a degaussing apparatus) that is capable of performing data erasing process for erasing data stored in a magnetic recording medium such as a hard disk drive (HDD) with ease and performing the magnetic data erasing process efficiently and surely by adapting a configuration in which the magnetic disk device is mounted in the data eraser at a suitable inclined angle and position.

According to a first aspect of the invention, the above mentioned problems are solved by providing a magnetic data eraser including: a tray on which the magnetic recording medium can be mounted and can also be immobilized by clamping it to the tray, the mounting tray being inclined at an angle of 60±10 degrees to the horizontal, a magnetizing zone that is encircled by a magnetizing coil and having a hollow portion into which the mounting tray is inserted, and a controller that causes an electric current to flow through the magnetizing coil as an excitation current, the excitation current generating a magnetic field that erases data stored in the magnetic recording medium.

Further, according to a second aspect of the invention, the above mentioned problems are solved by providing a magnetic data eraser including: a mounting and immobilizing tray on which the magnetic recording medium is mounted, the mounting and immobilizing tray being inclined at a predetermined angle, and the magnetizing zone having a section of a predetermined length at the front end of the zone and at the back end of the zone which ensure that the magnetic recording media to be erased is placed only between these sections in order to avoid influence of magnetic field decreases and/or flux angle changes at the ends of the zone; and a controller that makes an electric current flow as an excitation current through the magnetizing coil, the excitation current generating the magnetic field that erases the data stored in the magnetic recording medium.

Further, according to a third aspect of the invention, the above mentioned problems are solved by providing a magnetic data eraser including: a removable cabinet that consists of one or more mounting and immobilizing trays which are used to align the data storage media inserted in them in a desired direction, wherein each of the mounting tray locations is inclined at a predetermined angle and a magnetic recording medium is mounted on one of the mounting trays; a magnetizer that is encircled by a magnetizing coil having a hollow portion into which the mounting and immobilizing tray is received; and a controller that makes an electric current flow as an excitation current through the magnetizing coil, the excitation current generating a magnetic field to erase data stored in the magnetic recording medium.

Further, according to a fourth aspect of the invention, the above mentioned problems are solved by providing a magnetic data eraser including: a removable cabinet that has one or more mounting locations which are aligned in a desired direction, each of the mounting locations being inclined at an angle of 60±10 degrees, and providing a magnetizing zone having a section of a predetermined length at the front end of the zone and at the back end of the zone which ensure that the magnetic recording media to be erased is placed only between these sections in order to avoid influence of magnetic field and/or flux density decreases and/or flux angle changes at the ends of the zone; a magnetizer that is encircled by a magnetizing coil having a hollow portion through which the mounting and immobilizing tray is received; and a controller that makes an electric current to be flowed as an excitation current through the magnetizing coil, the excitation current generating a magnetic field to erase data stored in the magnetic recording medium by the magnetic field.

Further, according to a fifth aspect of the invention, the above mentioned problems are solved by providing a magnetic data eraser wherein the mounting and immobilizing tray is a pullout cabinet that is detachable from the body of the magnetic eraser.

Further, according to a sixth aspect of the invention, the above mentioned problems are solved by providing a magnetic data eraser further including a measuring coil that is wound around the magnetizing coil and measures the magnetic flux density of the field created by the magnetizing coil to generate an alarm when the measuring coil measures the magnetic flux density lower than a predetermined level of the magnetic flux density.

Further, according to a seventh aspect of the invention, the above mentioned problems are solved by providing a magnetic data eraser further including a thermometer that measures the temperature of the magnetizing coil, wherein the magnetic data eraser generates an alarm when the thermometer detects that the temperature of the magnetizing coil is higher than a predetermined temperature. That is, when the detected level of the temperature of the magnetizing coil becomes to be beyond the predetermined temperature level, an alarm is generated to a user to indicate lowering the resistivity, degrading the ease with which the electric current flow, and then decreasing the level of the magnetic flux density.

Advantages of the Invention

According to the present invention, it is possible to perform a data erasing process for erasing data stored in a magnetic recording medium such as a hard disk drive (HDD) with ease and to perform the magnetic data erasing process efficiently and surely by providing a magnetic data eraser that receives a removable cabinet that contains a mounting tray on which a magnetic recording medium such as hard disk drive (HDD) is mounted, the mounting tray being inclined at an angle of 60±10 degrees to the horizontal.

BRIEF DESCRIPTION OF THE DRAWINGS

The present invention will be understood more fully from the detailed description to be given herein below and from the accompanying drawings of the preferred embodiment of the invention, which should not be taken as a limitation on the specific embodiments but should be recognized as only serving the purpose of clarifying explanation and understanding.

In the drawings.

DETAILED DESCRIPTION OF PREFERRED EMBODIMENTS

Figure 1:
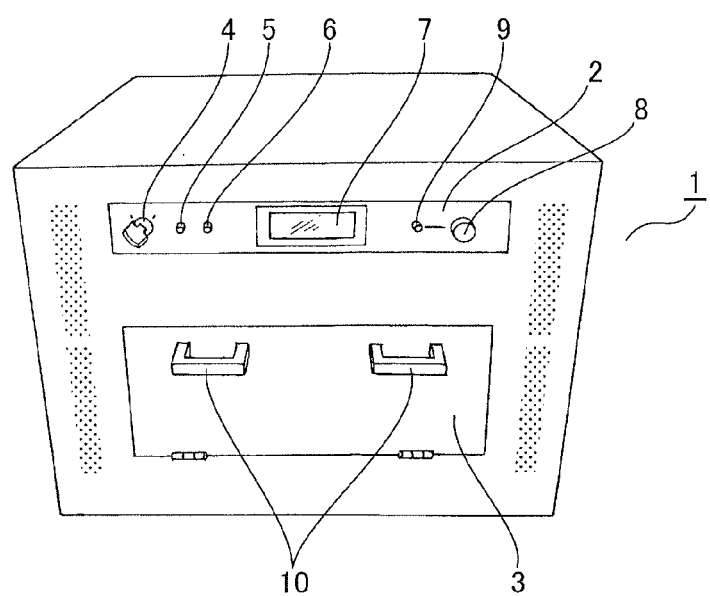
FIG. 1 is a diagram illustrating the structure of a magnetizing apparatus (a magnetic data eraser) for a magnetic recording medium, the diagram being a front view of the magnetizer, according to an embodiment of the present invention.

Some preferred embodiments of the present invention will be explained below with reference to attached drawings. Identical components are denoted by the same reference numerals throughout the drawings.

FIG. 1 is a diagram illustrating the structure of a magnetizing apparatus (a magnetic data eraser) for a magnetic recording medium, the diagram being a frontal inclined view of the magnetizer, according to an embodiment of the present invention.

In FIG. 1, an operating display panel 2 and a door opening into the hollow portion 3 that is opened when a pullout cabinet that will be explained below is inserted are provided on the front surface of the magnetic data eraser 1. The operating display panel 2 has a power switch 4, a power indicator 5, an error indicator 6, a liquid crystal display 7, an operation start button 8, and a charging indicator lamp 9.

The power switch 4 is a switch for activating the magnetizing apparatus 1 of the present embodiment, and when the power switch 4 is switched on, electric power is supplied to the magnetizing apparatus 1 and the power indicator will light. The error indicator 6 will light when, for example, a thermometer to be explained below detects a temperature higher than a predetermined temperature, an abnormal electric current flows through the measurement winding (or a measuring coil) 20, abnormal behavior occurs in an activation circuit, or some other trouble occurs in the magnetizing apparatus 1. Further, the liquid crystal display 7 displays information about the error indicated by the error indicator 6.

The operation button 8 is a button that is pushed after a magnetic recording medium such as a hard disk drive (HDD). is mounted in the magnetizing apparatus 1, the pushing of said button activating the process by which data stored in the magnetic recording medium will be erased. Furthermore, the charging lamp 9 is a lamp that lights during the time that the electric power necessary to magnetize a magnetic recording medium for a process such as, for example, magnetic data erasing, is charged into a condenser (not shown) after the condenser has been discharged in a previous process.

Figure 2:
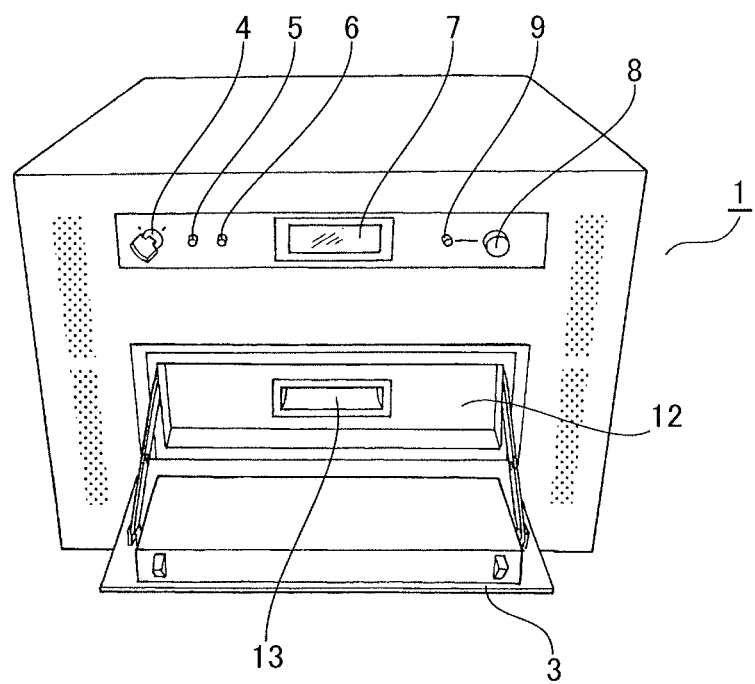
FIG. 2 is a structural diagram of the magnetizing apparatus in which the door to the hollow portion of the apparatus is open.

The covering door 3 is a door that is opened to allow the insertion of a pullout cabinet that will be explained below, and has one or more handles 10 on its front surface. For example, when a user grasps and pulls the handles 10, the covering door 3 opens toward the user. FIG. 2 is a structure diagram of the magnetizing apparatus in which the covering door 3 of the magnetizing apparatus 1 is open. In the state shown in FIG. 2, a pullout cabinet 12 is mounted in the magnetizing apparatus 1.

Figure 3:
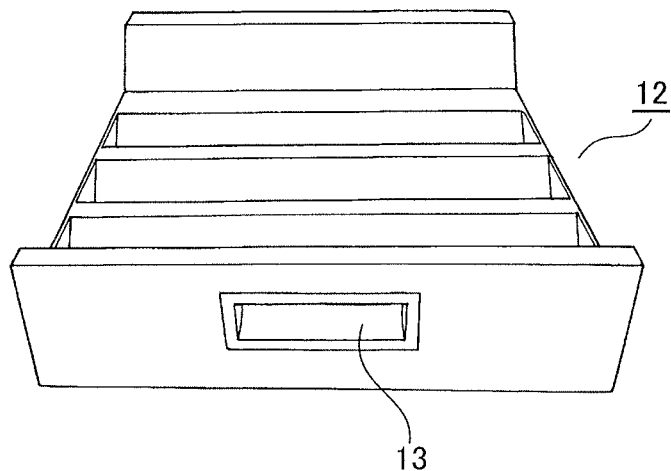
FIG. 3 is a frontal inclined view of the removable cabinet.
Figure 4:
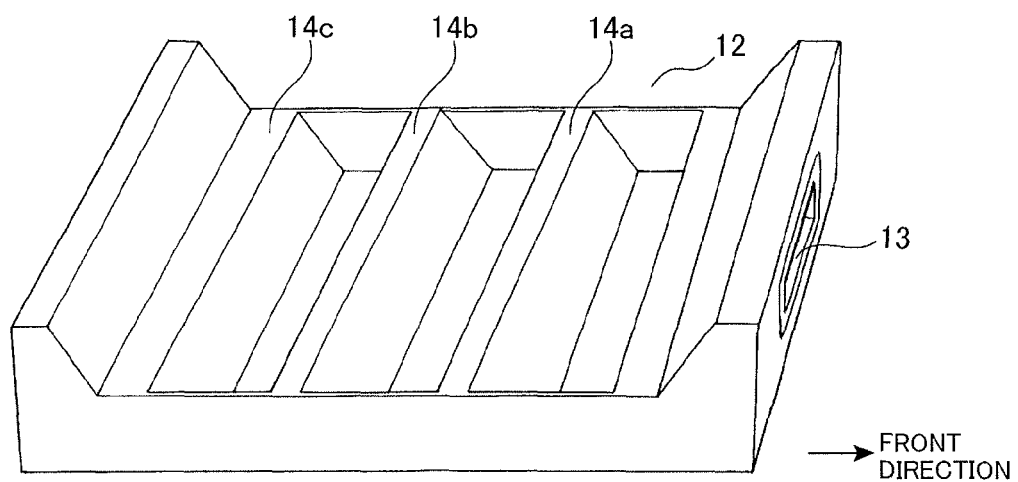
FIG. 4 is a side inclined view of the removable cabinet.

FIG. 3 is a frontal inclined view of the pullout cabinet 12 that is configured to be detachable from the magnetizing apparatus 1, and FIG. 4 is a side inclined view of the pullout cabinet 12. A handle 13 is provided on a front surface of the pullout cabinet 12. The user can use the handle 13 to hold the pullout cabinet while inserting it 12 into the magnetizing apparatus 1. As shown in FIGS. 3 and 4, mounting trays 14a, 14b, 14c for magnetic recording media such as hard disk drives are provided as part of the pullout cabinet 12 in order to permit the insertion of multiple magnetic media such as HDD into positions from the front end to the back end of the pullout cabinet 12.

Figure 5:
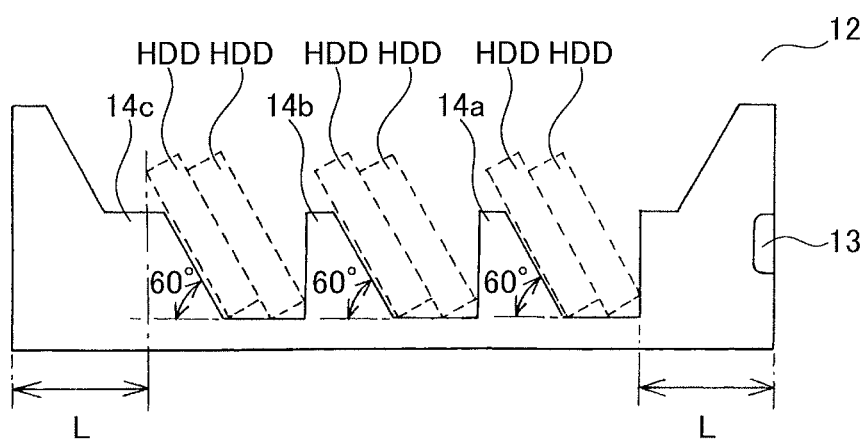
FIG. 5 is a diagram illustrating a state in which multiple HDD storing data to be erased are mounted on the mounting fixtures of the mounting and immobilizing tray.

All of the mounting trays 14a, 14b and 14c can be set at an angle of, for example, 60 degrees to the horizontal. However, it is allowable for the angles of incline of the mounting trays 14a, 14b and 14c to be 60±10 degrees, FIG. 5 is a diagram illustrating a state in which hard disk drives (HDDs) storing data being to be erased are mounted on the mounting trays 14a, 14b, 14c of the pullout cabinet 12. Each of the mounting trays 14a, 14b, 14c can hold two hard disk drives (HDD) and can immobilize the two hard disk drives (HDD) by a certain mechanism (not shown). As described above, each of the mounting trays 14a, 14b, 14c may be inclined at an angle of 60 degrees toward the horizontal plane (the bottom surface of the pullout cabinet (12) so that the hard disk drives (HDDs) mounted on the pullout cabinet 12 will be inclined at an angle of 60 degrees toward the horizontal plane.

Furthermore, the symbol "L" in FIG. 5 indicates a predetermined length to be explained below. As will be explained in more detail, the predetermined length indicates a length at the front end and the back end of the pullout cabinet 12, and the mounting trays 14a, 14b, 14c are designed to prevent hard disk drives (HDDs) from being positioned in the areas indicated by the symbol "L".

Figure 6:
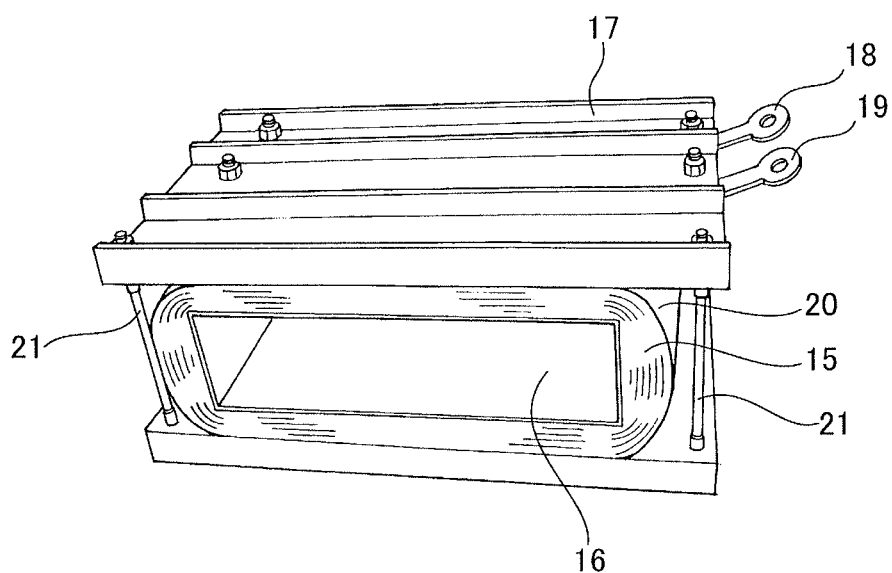
FIG. 6 is a diagram illustrating the inside structure of the magnetizing apparatus.

FIG. 6 is a diagram illustrating the inside structure of the magnetizing apparatus 1. In the magnetizing apparatus 1, a magnetizing coil 15, a hollow portion 16 into which the pullout cabinet 12 is inserted, and a heat sink 17 are provided. The magnetizing coil 15 is formed by winding a wire around the hollow portion (16), and the ends of the winding are connected to a power supply circuit (not shown) via leads 18, 19. It is possible to wind a standard round copper wire to form the magnetizing coil 15A, but a flat wire or a rectangular wire, for example, can also be used as the winding.

The hollow portion 16 is sized to hold the pullout cabinet 12 mentioned above. In the hollow portion 16, the magnetic field generated by the magnetizing coil 15 is in a perpendicular direction from the plane of the front side of the equipment 1 to the plane of the rear side of the equipment 1, or in a perpendicular direction from the plane of the rear side of the equipment 1 to the plane of the front side of the equipment 1.

Further, 1-2 turns (T) of a measurement winding (that is, a measuring coil) 20 may be wound around the magnetizing coil 15. This measuring coil 20 is used to make measurements of the magnetic flux density of the magnetic field generated by the magnetizing coil 15, and the measured data may be sent to a controller via a lead (not shown). The electric current flowing through the measuring coil 20 may be used to light the indicator lamp (not shown) provided at the front surface of the magnetizing apparatus 1 so as to indicate to the user that the magnetizing process is proceeding.

A heat sink is provided that is in contact with the top surface and the bottom surface of the magnetizing coil 15, and is fixed to the magnetizing coil 15 by a fixing means 21.

Using the magnetizing apparatus 1 described above, the process for erasing data stored in a hard disk drive (HDD) would start with the step of pulling the pullout cabinet 12 from the magnetizing apparatus 1 followed by the step in which hard disk drives (HDDs) are mounted on the mounting trays 14a, 14b, 14c as shown in FIG. 5. Hence, the magnetizing apparatus 1 according to the present embodiment can hold 6 hard disk drives (HDDs) in the pullout cabinet 12.

Next, the user can insert the pullout cabinet 12 at a predetermined position in the magnetizing apparatus 1, and can close the covering door 4 using the handle 13 of the pullout cabinet.

At this stage, the user pushes the operation button 8 to cause electric current to flow through the magnetizing coil 15 from an electric current supplying circuit (not shown) and to excite the magnetizing coil 15, thereby generating a magnetic field in the hollow portion 16 of the magnetizing apparatus 1. This magnetic field is generated in a perpendicular direction from the plane of the back surface of the equipment to the plane of the front surface of the magnetizing apparatus 1 so that the magnetic field passes at a 60 degree angle to the horizontal through the hard disk drive (HDD) mounted on the pullout cabinet 12 that is inserted to the hollow portion 16.

By this process, the hard disk is magnetized uniformly in one direction, so that data stored in the hard disk drive (HDD) is erased. Because the magnetic flux is passed through the hard disk drive at a 60 degree angle to the horizontal, it is ensured that magnetic data stored in either a hard disk drive (HDD) adopting a perpendicular magnetic recording method or a hard disk drive (HDD) adopting an in-plane magnetic recording method (or horizontal magnetic recording method) can be erased efficiently.

Figure 7:
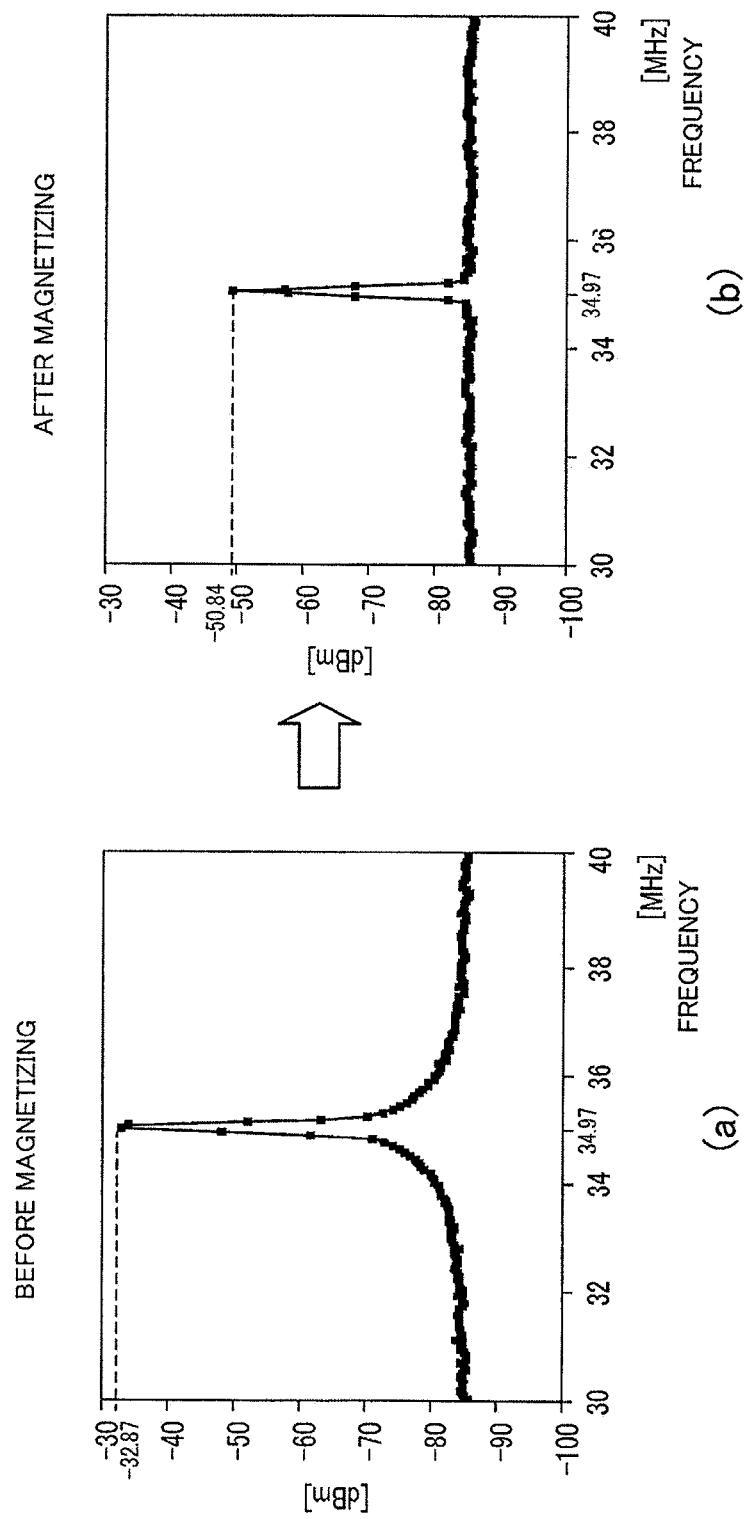
FIG. 7(a) is a diagram illustrating a measurement result for the signal strength of a signal recorded in an HDD obtained before erasure when the hard disk drive (HDD) is horizontally mounted.
FIG. 7(b) is a diagram illustrating a measurement result for the signal strength of a signal recorded in an HDD obtained after erasure when the hard disk drive (HDD) is horizontally mounted.
Figure 8:
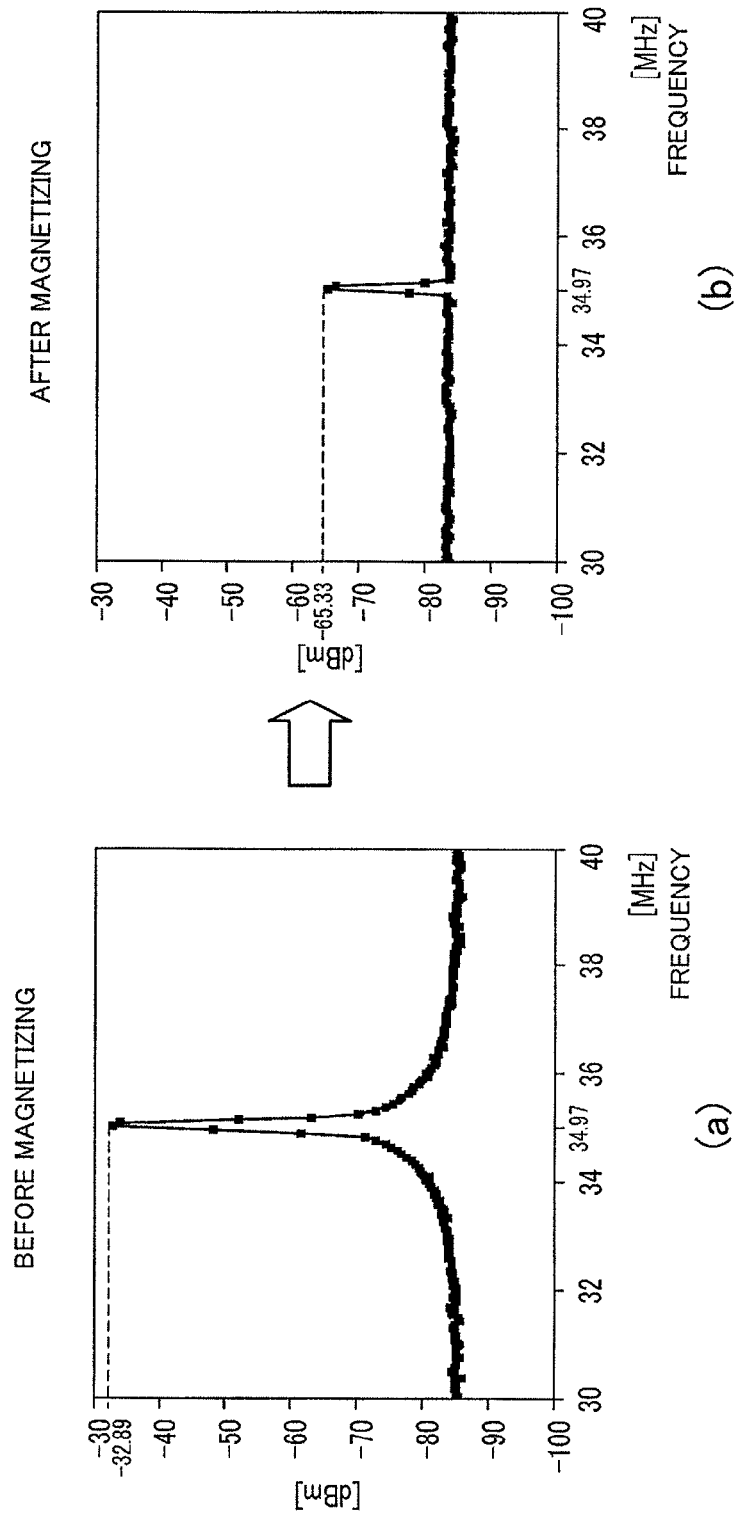
FIG. 8(a) is a diagram illustrating a measurement result for the signal strength of a signal recorded in an HDD obtained before erasure when the hard disk drive (HDD) is mounted in a manner where the HDD is inclined at an angle of 45 degrees.
FIG. 8(b) is a diagram illustrating a measurement result for the signal strength of a signal recorded in an HDD obtained after erasure when the hard disk drive (HDD) is mounted in a manner where the HDD is inclined at an angle of 45 degrees.
Figure 9:
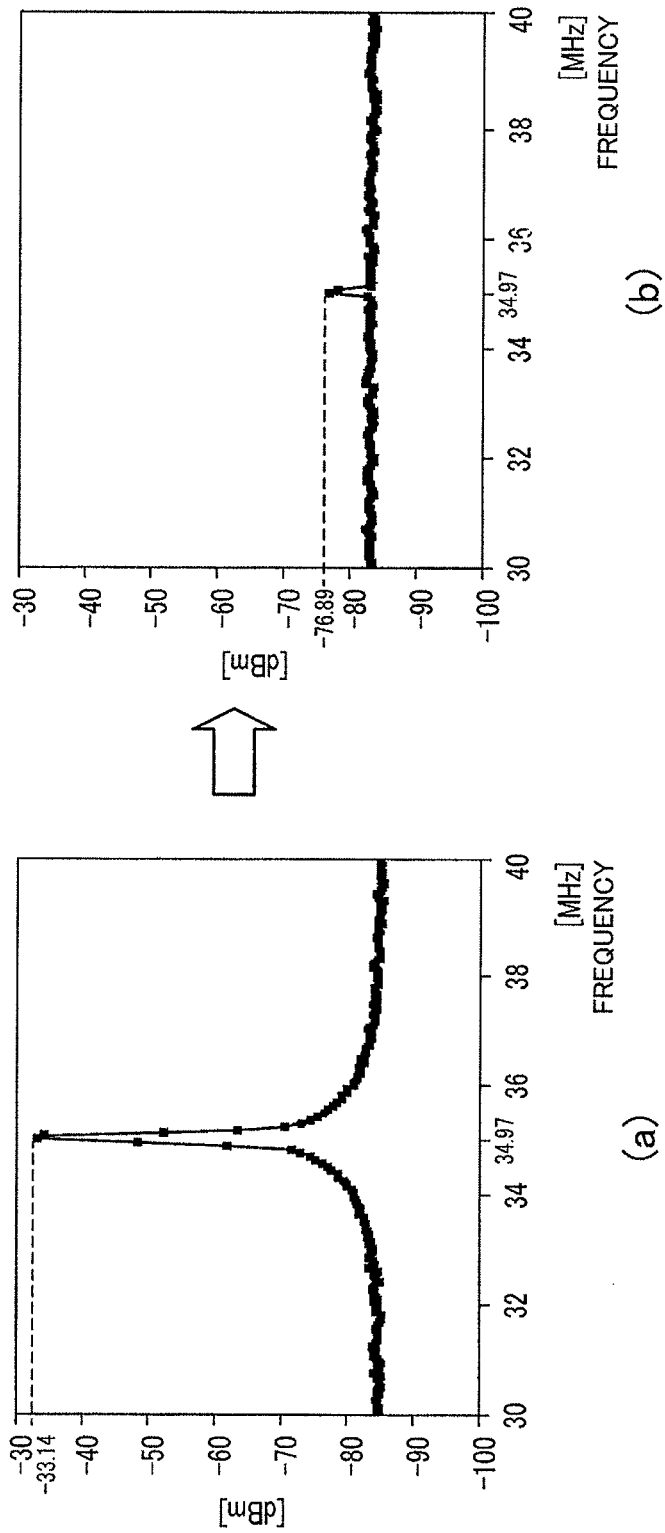
FIG. 9(a) is a diagram illustrating a measurement result for the signal strength of a signal recorded in an HDD obtained before erasure when the hard disk drive (HDD) is mounted in a manner where the HDD is inclined at an angle of 60 degrees.
FIG. 9(b) is a diagram illustrating a measurement result for the signal strength of a signal recorded in an HDD obtained after erasure when the hard disk drive (HDD) is mounted in a manner where the HDD is inclined at an angle of 60 degrees.
Figure 10:
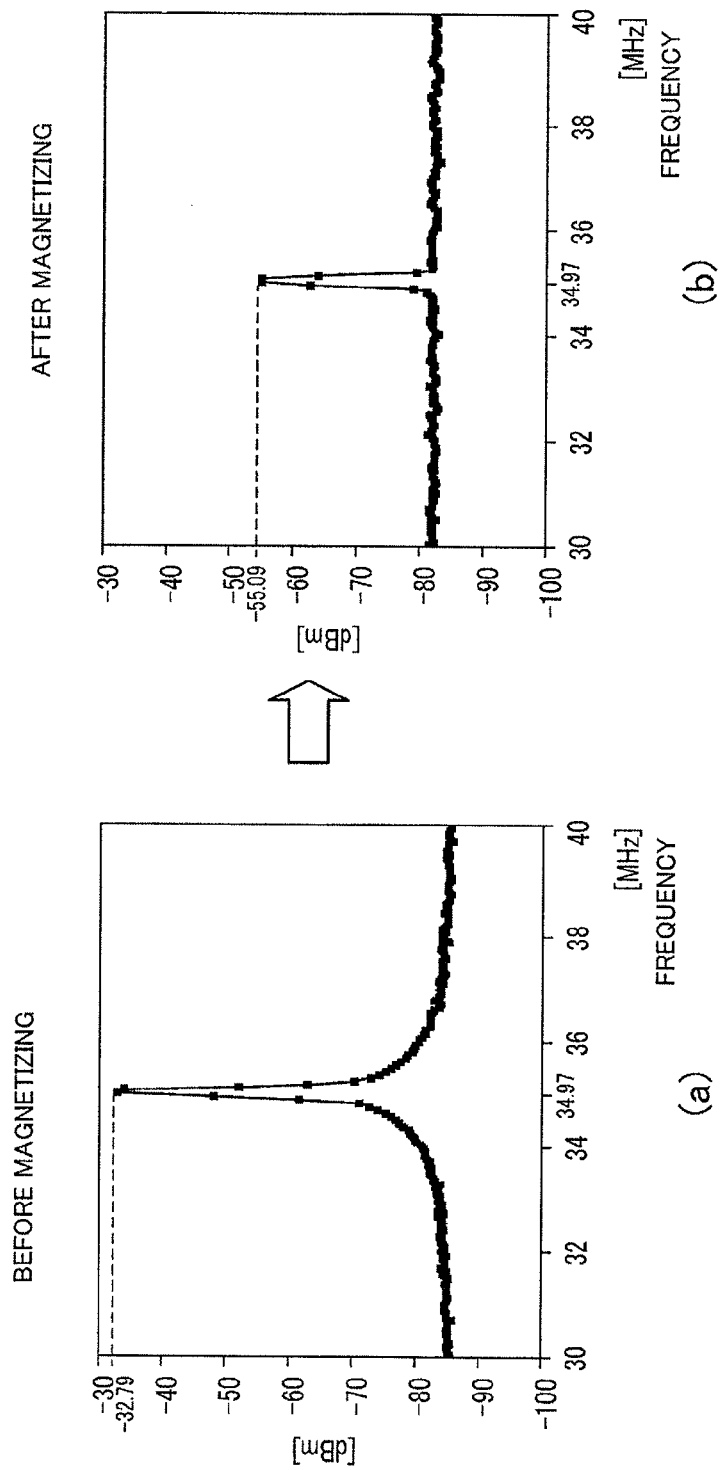
FIG. 10(a) is a diagram illustrating a measurement result for the signal strength of a signal recorded in an HDD obtained before erasure when the hard disk drive (HDD) is mounted in a manner where the HDD is inclined at an angle of 90 degrees.
FIG. 10(b) is a diagram illustrating a measurement result for the signal strength of a signal recorded in the HDD obtained after erasure when the hard disk drive (HDD) is mounted in a manner where the HDD is inclined at an angle of 90 degrees.

FIGS. 7 to 10 are diagrams illustrating measurement results proving that data are erased most efficiently and maximum erasure occurs when the hard disk drive (HDD) is inclined at an angle of 60 degrees to the horizontal. FIG. 7 is a diagram showing a measurement result obtained when a hard disk drive (HDD) is horizontally mounted, FIG. 8 is a diagram showing a measurement result obtained when a hard disk drive (HDD) is mounted in a manner where the HDD is inclined at an angle of 45 degrees, FIG. 9 is a diagram showing a measurement result obtained when a hard disk drive (HDD) is mounted in a manner where the HDD is inclined at an angle of 60 degrees, and FIG. 10 is a diagram showing a measurement result obtained when a hard disk drive (HDD) is mounted in a manner where the HDD is inclined at an angle of 90 degrees (that is, in the vertical direction).

Diagrams 7(a), 8(a), 9(a) and 10(a) which are shown, respectively, at the left side of FIGS. 7, 8, 9 and 10, show measurement results obtained before magnetizing (that is, erasing) a hard disk drive (HDD). Diagrams 7(b), 8(b), 9(b) and 10(b) show measurement results obtained after magnetizing (erasing) the hard disk drive (HDD). The horizontal axes of the figures show the frequency used in recording or reading the signals. The vertical axes of the figures show the signal strength of recorded or signals remaining after magnetizing (erasing) in dBm. (dBm is the power ratio in dB of the measured power referenced to 1 mW; 0 dBm=1 mw.)

When a hard disk drive (HDD) is inclined at an angle of 0 degree, that is horizontally mounted (FIG. 7), the peak value before magnetizing the hard disk drive (HDD) is −32.87 dBm as shown in FIG. 7(a), and the peak value after magnetizing the hard disk drive (HDD) is −50.82 dBm as shown in FIG. 7(b). Hence, in this case, a reduction of the signal strength on the hard disk drive (HDD) of 17.95 dBm can be obtained.

When an HDD is inclined at an angle of 45 degrees (FIG. 8), the peak value before magnetizing the hard disk drive (HDD) is −32.89 [dBm] as shown in FIG. 8(a), and the peak value after magnetizing the hard disk drive (HDD) is −65.33 dBm as shown in FIG. 8(b). Hence, in this case, reduction of signal strength on the hard disk drive (HDD) of 32.44 dBm can be obtained.

Next, in the case where a HDD is inclined at an angle of 60 degrees (FIG. 9), the peak value before magnetizing the hard disk drive (HDD) is −33.14 [dBm] as shown in FIG. 9(a), and the peak value after magnetizing the hard disk drive (HDD) is −76.89 dBm as shown in FIG. 9(b). Hence, in this case, a reduction of signal strength on the hard disk drive (HDD) of 43.74 dBm can be obtained.

Further, in the case where a HDD is inclined at an angle of 90 degrees, that is in the vertical direction (FIG. 10), the peak value shown before magnetizing the hard disk drive (HDD) in FIG. 10(a) is −32.79 dBm, and the peak value shown after magnetizing the hard disk drive (HDD) in FIG. 10(b) is −55.09 dBm. Hence, in this case, a reduction of signal strength on the hard disk drive (HDD) of 22.30 dBm can be obtained.

According to the measurement results mentioned above, it can be seen that maximum data erasure is obtained when the hard disk drive (HDD) is inclined at an angle of about 60 degrees to the horizontal.

Further, the measurements under the conditions in which the hard disk drive (HDD) is inclined at an angle of near 60 degrees have been performed. Specifically, the measurements under the conditions in which the hard disk drive (HDD) is inclined at an angle of 50, 55, 65, 70, and 75 degrees have been performed.

Figure 11:
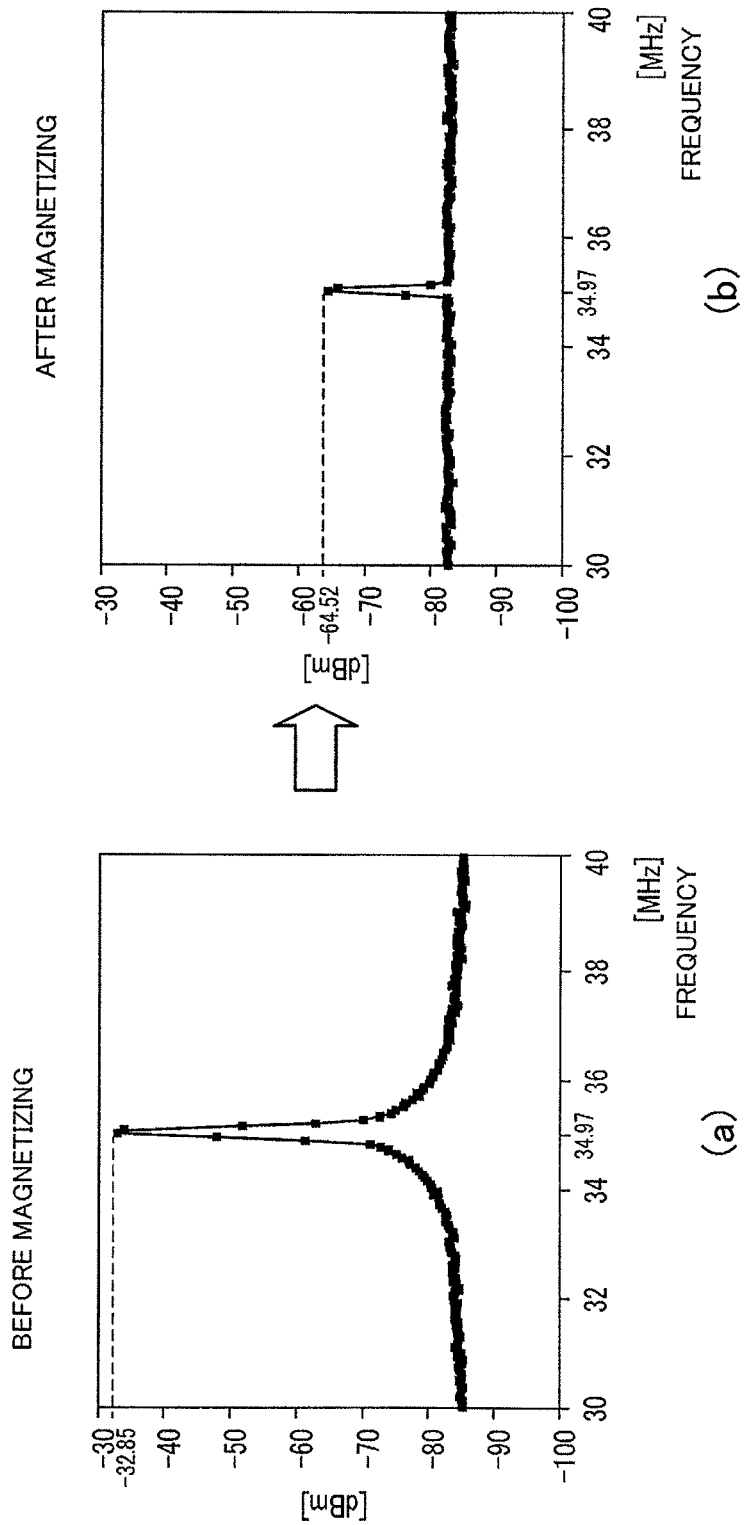
FIG. 11(a) is a diagram illustrating a measurement result for the signal strength of a signal recorded in an HDD obtained before erasure when the hard disk drive (HDD) is mounted in a manner where the HDD is inclined at an angle of 50 degrees.
FIG. 11(b) is a diagram illustrating a measurement result for the signal strength of a signal recorded in an HDD obtained before erasure when the hard disk drive (HDD) is mounted in a manner where the HDD is inclined at an angle of 50 degrees.

First, FIG. 11 illustrates a case where a HDD is inclined at an angle of 50 degrees against to the horizontal axis. The peak value shown before magnetizing the hard disk drive (HDD) in FIG. 11(a) is −32.85 dBm, and the peak value shown after magnetizing the hard disk drive (HDD) in FIG. 11(b) is −64.52 dBm. Hence, in this case, a reduction of signal strength on the hard disk drive (HDD) of 31.67 dBm can be obtained.

Figure 12:
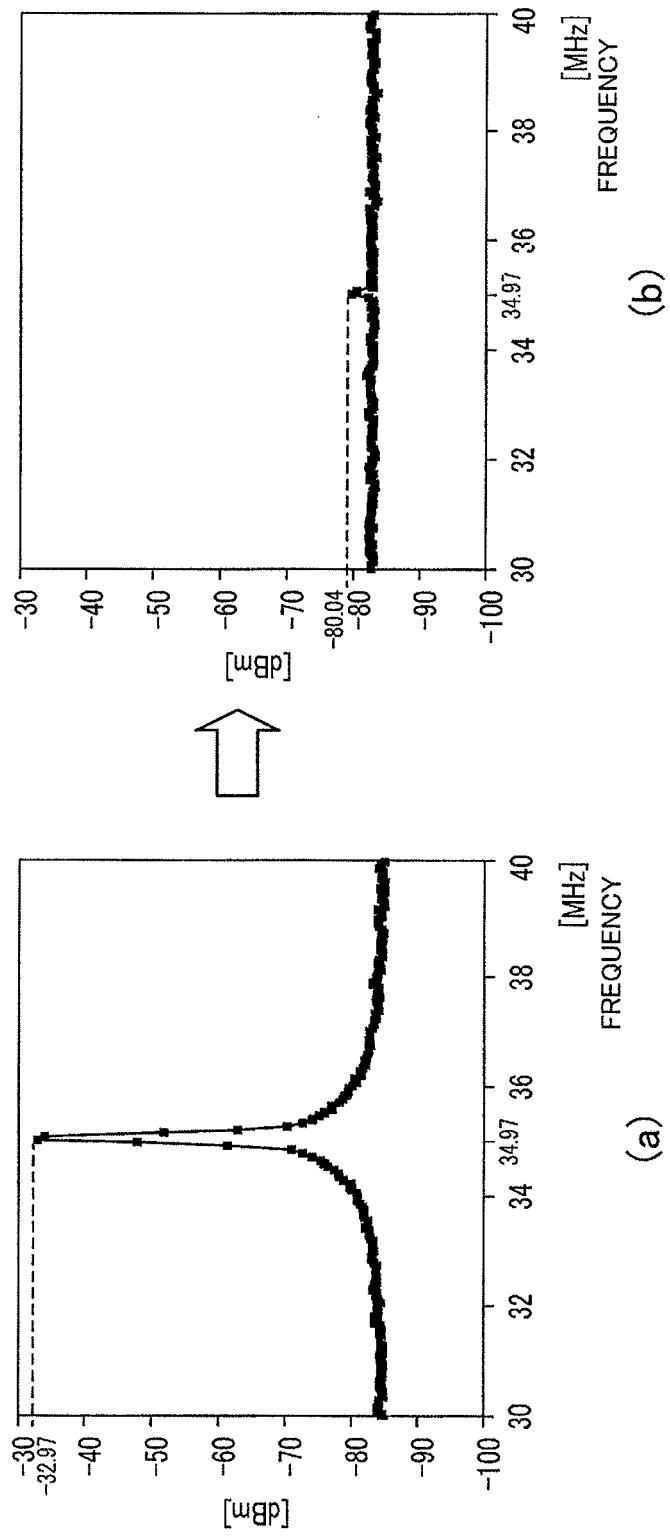
FIG. 12(a) is a diagram illustrating a measurement result for the signal strength of a signal recorded in an HDD obtained before erasure when the hard disk drive (HDD) is mounted in a manner where the HDD is inclined at an angle of 55 degrees.
FIG. 12(b) is a diagram illustrating a measurement result for the signal strength of a signal recorded in an HDD obtained before erasure when the hard disk drive (HDD) is mounted in a manner where the HDD is inclined at an angle of 55 degrees.

Next, FIG. 12 illustrates a case where a HDD is inclined at an angle of 55 degrees against to the horizontal axis. The peak value shown before magnetizing the hard disk drive (HDD) in FIG. 12(a) is −32.97 dBm, and the peak value shown after magnetizing the hard disk drive (HDD) in FIG. 12(b) is −80.04 dBm. Hence, in this case, a reduction of signal strength on the hard disk drive (HDD) of 47.07 dBm can be obtained.

Figure 13:
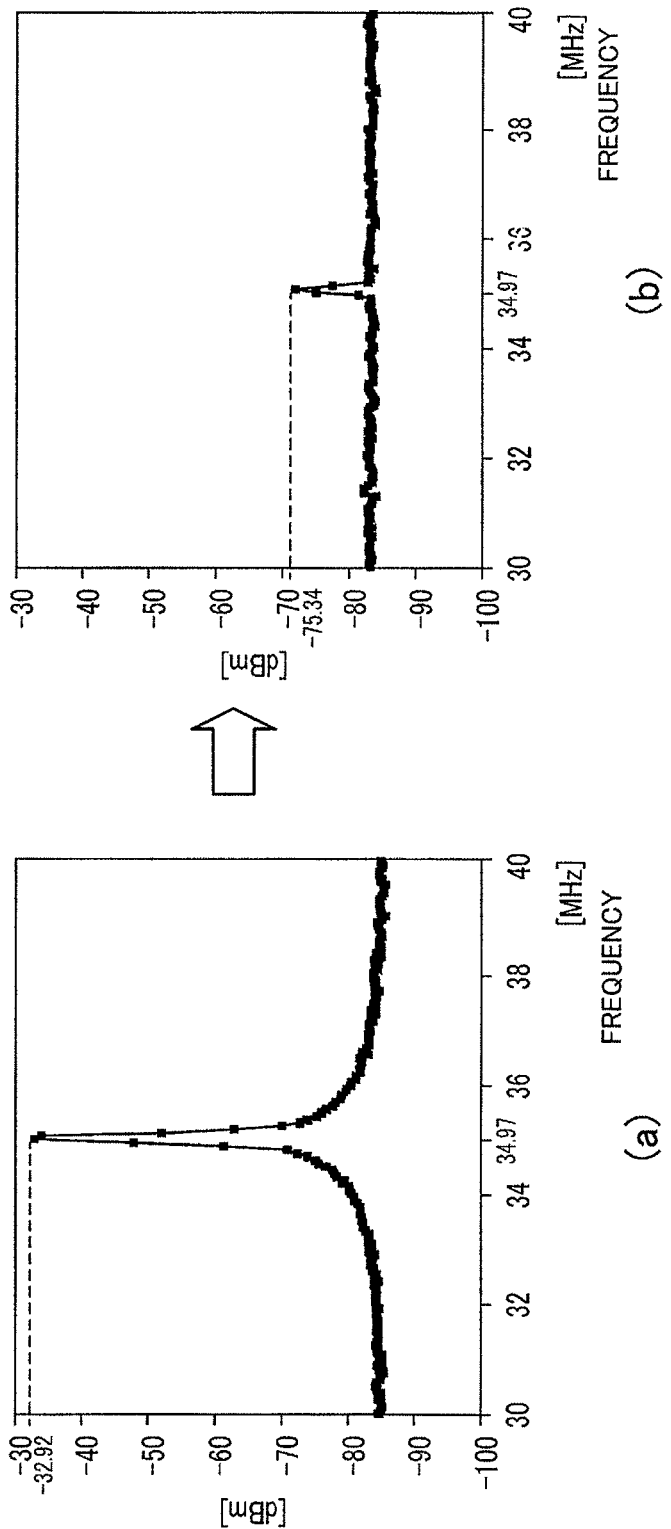
FIG. 13(a) is a diagram illustrating a measurement result for the signal strength of a signal recorded in an HDD obtained before erasure when the hard disk drive (HDD) is mounted in a manner where the HDD is inclined at an angle of 65 degrees.
FIG. 13(b) is a diagram illustrating a measurement result for the signal strength of a signal recorded in an HDD obtained before erasure when the hard disk drive (HDD) is mounted in a manner where the HDD is inclined at an angle of 65 degrees.

FIG. 13 illustrates a case where a HDD is inclined at an angle of 65 degrees against to the horizontal axis. The peak value shown before magnetizing the hard disk drive (HDD) in FIG. 13(a) is −32.92 dBm, and the peak value shown after magnetizing the hard disk drive (HDD) in FIG. 13(b) is −75.34 dBm. Hence, in this case, a reduction of signal strength on the hard disk drive (HDD) of 42.42 dBm can be obtained.

Figure 14:
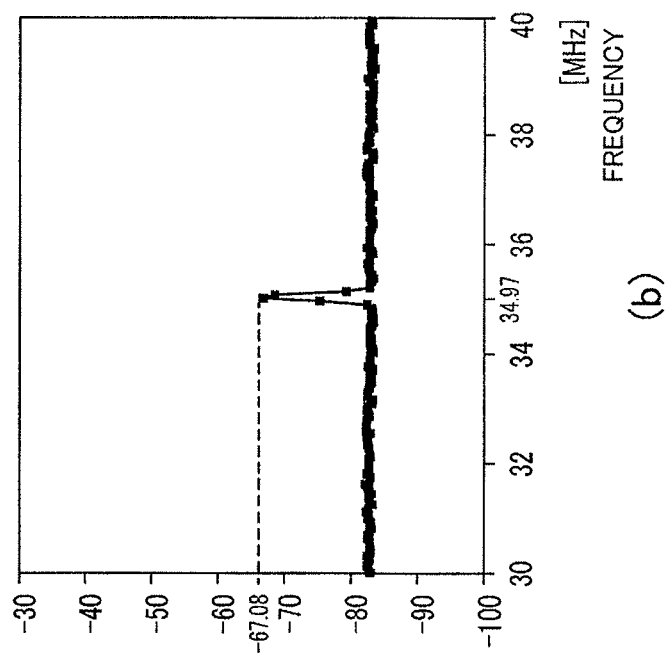
FIG. 14(a) is a diagram illustrating a measurement result for the signal strength of a signal recorded in an HDD obtained before erasure when the hard disk drive (HDD) is mounted in a manner where the HDD is inclined at an angle of 70 degrees.
FIG. 14(b) is a diagram illustrating a measurement result for the signal strength of a signal recorded in an HDD obtained before erasure when the hard disk drive (HDD) is mounted in a manner where the HDD is inclined at an angle of 70 degrees.
Figure 14:
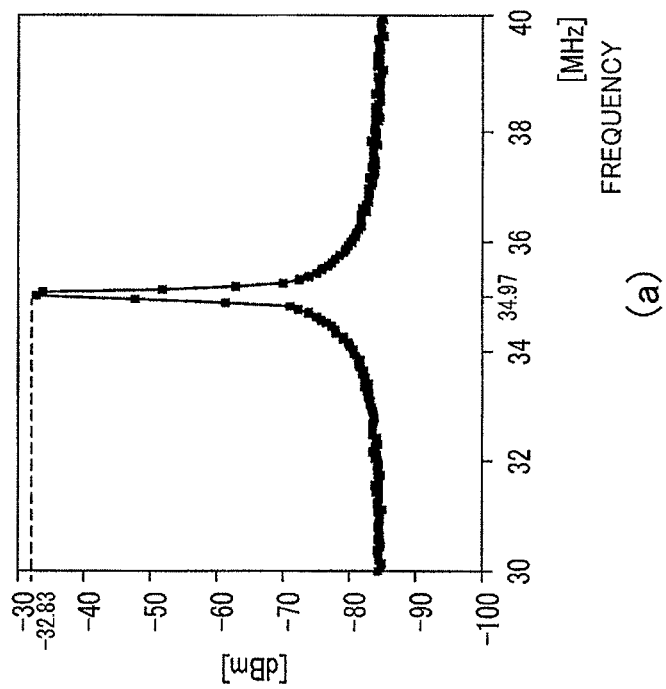

FIG. 14 illustrates a case where a HDD is inclined at an angle of 70 degrees against to the horizontal axis. The peak value shown before magnetizing the hard disk drive (HDD) in FIG. 11(a) is −32.83 dBm, and the peak value shown after magnetizing the hard disk drive (HDD) in FIG. 11(b) is −67.08 dBm. Hence, in this case, a reduction of signal strength on the hard disk drive (HDD) of 34.25 dBm can be obtained.

Figure 15:
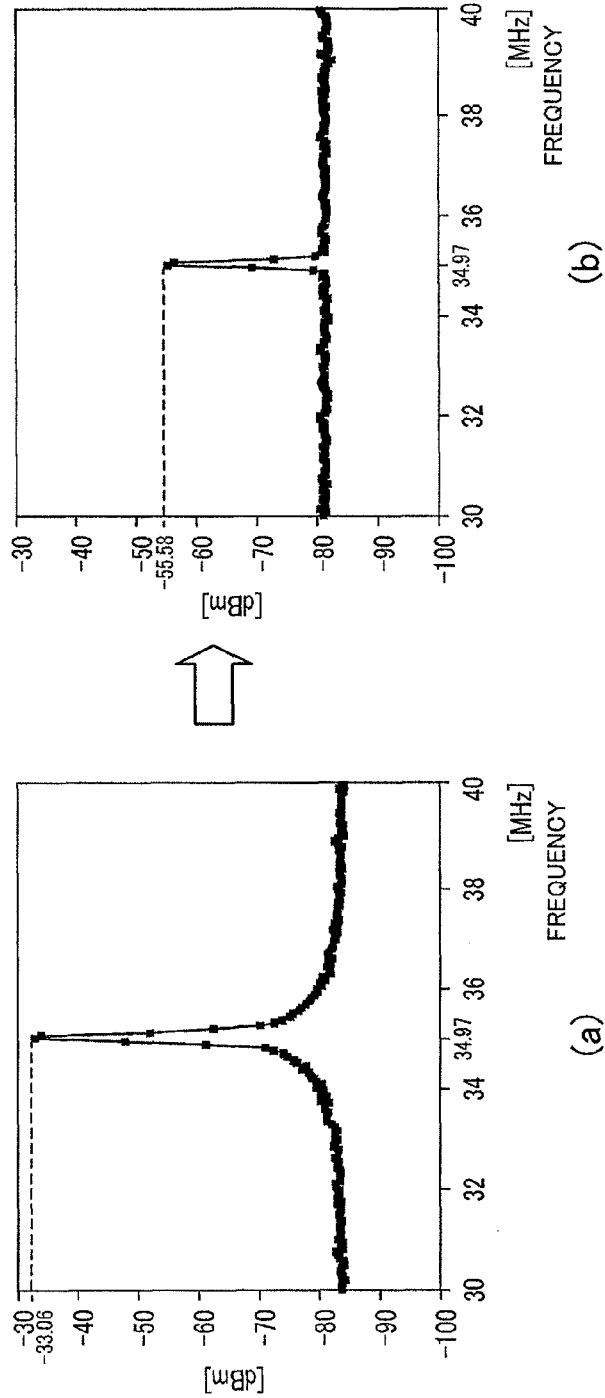
FIG. 15(a) is a diagram illustrating a measurement result for the signal strength of a signal recorded in an HDD obtained before erasure when the hard disk drive (HDD) is mounted in a manner where the HDD is inclined at an angle of 75 degrees.
FIG. 15(b) is a diagram illustrating a measurement result for the signal strength of a signal recorded in an HDD obtained before erasure when the hard disk drive (HDD) is mounted in a manner where the HDD is inclined at an angle of 75 degrees.

Further, FIG. 15 illustrates a case where a HDD is inclined at an angle of 75 degrees against to the horizontal axis. The peak value shown before magnetizing the hard disk drive (HDD) in FIG. 15(a) is −33.06 dBm, and the peak value shown after magnetizing the hard disk drive (HDD) in FIG. 15(b) is −55.58 dBm. Hence, in this case, a reduction of signal strength on the hard disk drive (HDD) of 22.52 dBm can be obtained.

As above-mentioned results, reductions of signal strength after magnetizing the hard disk drive (HDD) are: −17.95 dBm when the HDD is inclined at an angle of 0 degrees against to the horizontal axis; −32.44 dBm when at an angle of 45 degrees; −31.67 dBm when at an angle of 50 degrees; −47.07 dBm when at an angle of 55 degrees; −43.74 dBm when at an angle of 60 degrees; −42.42 dBm when at an angle of 65 degrees; −34.25 dBm when at an angle of 70 degrees; −22.52 dBm when at an angle of 75 degrees; and −22.30 dBm when at an angle of 90 degrees.

Figure 16:
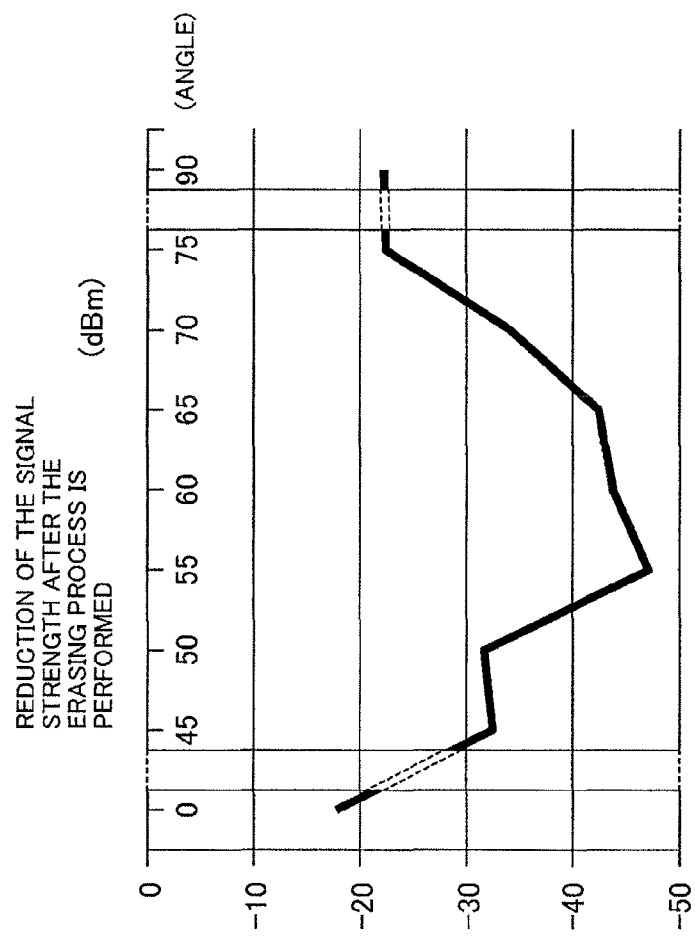
FIG. 16 is a diagram illustrating signal strength after magnetizing the hard disk drive (HDD)

FIG. 16 is a diagram illustrating results of the above-mentioned measurements, where the horizontal axis indicates a mounting angle of the hard disk drive (HDD) against to the horizontal direction, and the vertical axis indicates reduction of the signal strength after the erasing process is performed. As shown in this figure, it has been seen that, for angles between 50 degrees and 70 degrees inclination against the horizontal direction, large reduction of the signal strength is obtained and data stored in a hard disk drive (HDD) can be erased most efficiently.

Therefore, data stored in a hard disk drive (HDD) can be erased most efficiently and the electric power consumed in a data erasing process can be reduced, by setting the hard disk drive (HDD) in the pullout cabinet 12 so that the hard disk drive (HDD) is inclined at an angle of about 60±10 degrees and by then performing the data erasing process for erasing the data stored in the hard disk drive (HDD). That is, it has been seen that data stored in a hard disk drive (HDD) can be erased most efficiently and maximum data erasure is obtained when the hard disk drive (HDD) is inclined at an angle of about 60±10 degrees. For example, the magnetic flux density (that is, magnetic field intensity) needed for performing such a data erasing process is about 7,000 Gauss while 10,000 Gauss is needed using a conventional method of erasing with the HDD.

Further, as mentioned above, a magnetic field is generated by the magnetizing coil in the hollow portion 16 shown in FIG. 6. For example, a magnetic field is generated by the magnetizing coil 15 in an essentially perpendicular direction from the plane of the front side of the erasing equipment, or in a direction essentially in an essentially perpendicular direction from the place of the back side of the erasing equipment. In this case, at the openings in the ends of the magnetizing coil 15, the magnetic flux pattern changes as the flux exits or enters the coil. This leads to a reduction in the magnetic flux density and a leakage at the ends of the magnetizing coil 15, that is, the open ends of the hollow portion 16. This reduction increases as the measurement point moves from the center of the coil closer to the ends of the magnetizing coil 15. Therefore, a front portion and a back portion of the magnetizing coil are designated, each having a predetermined length L, which may not be used to erase data stored in the hard disk drive (HDD).

Figure 17:
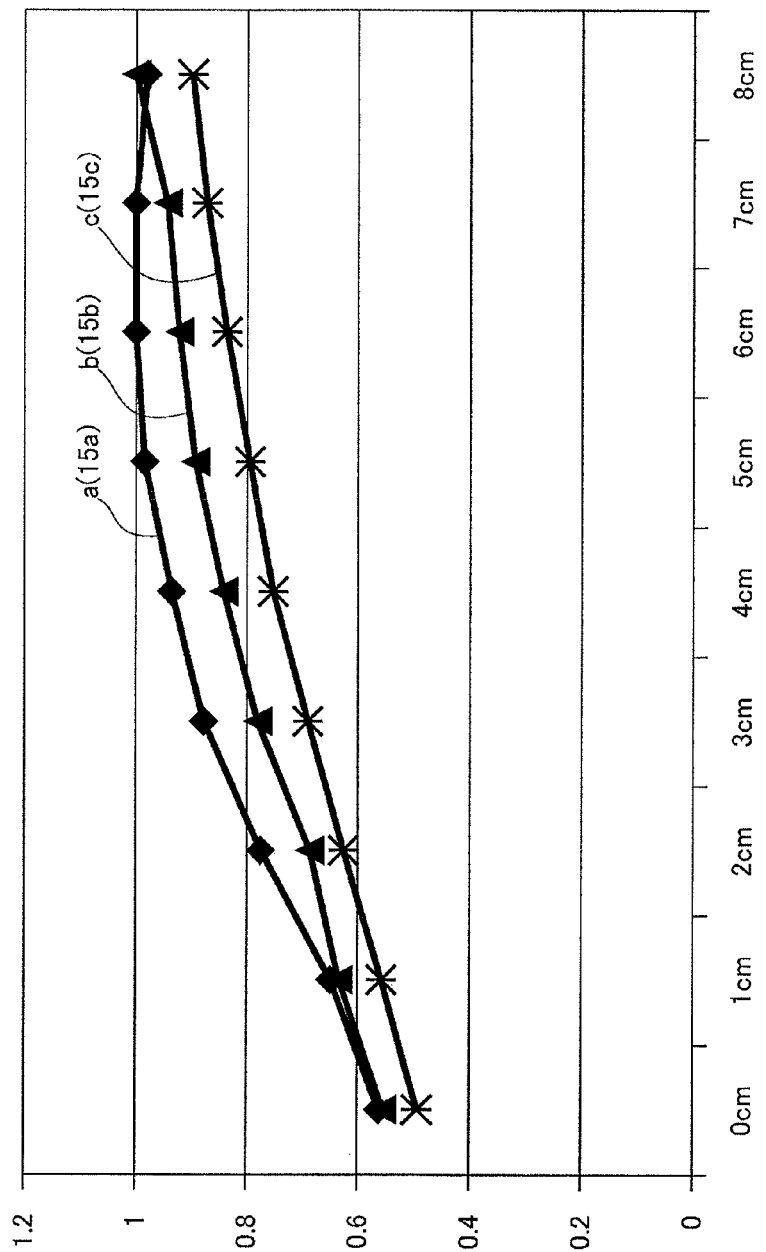
FIG. 17 is a diagram showing measurement results on the vertical axis for the ratio of measured signal strength to maximum signal strength when using a magnetizing zone with a front portion and a back portion each having a predetermined length L. These lengths L are shown on the horizontal axis of the diagram.

FIG. 17 illustrates measurement results for a magnetizing coil 15 design including a front portion and a back portion which have a predetermined length L. It should be noted that the amount of magnetic flux density reduction near the ends of the magnetizing coil will vary depending on the total length of the magnetizing coil 15 and on other factors. In this embodiment, measurement results have been obtained using three lengths of magnetizing coils: these are shown as curves 15a, 15b and 15c in FIG. 17. In FIG. 17, the horizontal axis values show distances from one end of the magnetizing coil 15, and the vertical axis values show the ratio of measured magnetic flux density measured at specific distance to the maximum flux density in the coil. Thus, each curve shows the ratio of measured magnetic flux density to maximum magnetic flux density in the coil for specific positions in the magnetizing coil 15.

In FIG. 17, curve 15(a) is a curve showing measurement results obtained using the shortest magnetizing coil 15(a). In the measurement results shown in curve 15(a), the peak of the magnetic field strength occurs at a position whose distance from one end of the magnetizing coil 15a is 6-7 cm, and the magnetic field strength decreases as the measurement point approaches either end of the magnetizing coil 15a. Hence, when the magnetic field strength is required to be larger than 80% of the peak value, the area that must be used for erasing data is inside the front end of the magnetizing coil 15a by at least 3 cm and is inside the back end of magnetizing coil 15a by at least 3 cm so that the predetermined length L should be set to be 3 cm In FIG. 17, curve 15(b) is a curve showing measurement results obtained by using an intermediate length magnetizing coil 15b. In the measurement results shown in curve 15(b), the peak of the magnetic field strength occurs at a position whose distance from one end of the magnetizing coil 15b was 8-9 cm, and the magnetic field strength decreases as the measurement point approaches either end of the magnetizing coil 15b. Hence, similar to the case shown in Curve 15(a), when the required value of the magnetic field strength is required to be larger than 80% of the peak value, the area that must be used for erasing data is separated from the front end of the magnetizing coil 15b by at least 4 cm, and is separated from the back end of magnetizing coil 15b by at least 4 cm, so that the predetermined length L should be set to be 4 cm.

Curve 15(c) is a curve showing measurement results obtained by using the longest magnetizing coil 15c. In the measurement results shown in curve 15(c), the peak of the magnetic field strength occurs at a position whose distance from one end of the magnetizing coil 15c was longer than 8 cm. Hence, similar to the case shown in Curve 15(a) and Curve 15(b), when the required value of the magnetic field strength is required to be larger than 80% of the peak value, the area that must be used for erasing data is separated from the front end of the magnetizing coil 15b by at least 5 cm, and is separated from the back end of the magnetizing coil 15b by at least 5 cm, so that the predetermined length L should be set to be 5 cm.

As discussed above, in the present embodiment, a front portion having a predetermined length L and a back portion having a predetermined length L at the front end and the back end of the magnetizing coil 15 are provided wherein the front portion and the back portion are not used to erase data stored in the hard disk drive (HDD) because of the reduction of magnetic flux density near the ends of the magnetizing coil 15. By using such a configuration, it is possible to erase data stored in the hard disk drive (HDD) more efficiently.

In this embodiment, the required value of the magnetic field strength is set to be larger than 80% of the peak value. However, it is possible to set the required value of the magnetic field strength to be a value other than 80% of the peak value.

Further, in the present embodiment, the magnetic data eraser is configured such that two hard disk drives (HDDs) are mounted on each of the mounting trays 14a, 14b, 14c, as shown in FIG. 5, so that a total of six hard disk drives (HDDs) can be mounted on the pullout cabinet 12. However, the magnetic data eraser can be configured so that either two mounting trays 14 are provided on the pullout cabinet 12 or three or more mounting trays 14 are provided on the pullout cabinet 12. Further, it is possible to configure the magnetic data eraser so that only one hard disk drive (HDDs) is mounted on each of the mounting trays 14, or so that two or more hard disk drives (HDDs) are placed side by side on each of the mounting trays. Depending on the design of the mounting tray, any number of HDD can be mounted on a mounting tray.

In the above explanation of the present embodiment, the magnetic data eraser is configured such that the mounting and immobilizing trays 14a, 14b, 14c on which the hard disk drives (HDDs) are mounted may be provided in the pullout cabinet 12. However, the mounting and immobilizing trays such as those used in the pullout cabinet are not limited to being used in the pullout cabinet 12. It is allowable that the mounting and immobilizing tray is configured such that hard disk drives (HDDs) are directly placed on a mounting tray that is installed in the hollow portion 16. Further, it is allowable that a belt conveyor mechanism be installed with the mounting and immobilizing tray to carry hard disk drives (HDDs) from the front side to the back side of the hollow portion 16 or vice versa so that the data erasing process may proceed on an automated basis.

Further, in the above explanation, although a magnetic recording medium is exemplified by a hard disk drive (HDD), it should be understood that the magnetic recording medium is not limited to a hard disk drive (HDD).

What is claimed is:

1. A magnetic data eraser, comprising:
a mounting and immobilizing tray on which magnetic recording media are mounted, the mounting and immobilizing tray being inclined at a predetermined angle to the horizontal, the magnetizing zone having a section of a predetermined length at a front end of the zone and at a back end of the zone which ensure that the magnetic recording media to be erased is placed only between the sections in order to avoid influence of magnetic field flux decreases and/or flux angle changes at the front and back ends of the zone;
a controller that is configured to cause an electric current to flow as an excitation current through a magnetizing coil, the excitation current generating a magnetic field to erase data stored in the magnetic recording medium.

2. The magnetic data eraser according to claim 1, wherein the mounting and immobilizing tray is a pullout cabinet that is detachable from a body of the magnetic data eraser.

3. The magnetic data eraser according to claim 1, further comprising:
a measuring coil is wound around the magnetizing coil and is configured to measure the magnetic flux density of the magnetic field created by the magnetizing coil.

4. The magnetic data eraser according to claim 1, further comprising:
a thermometer configured to measure a temperature of the magnetizing coil and generate an alarm when the thermometer detects that the temperature of the magnetizing coil is higher than a predetermined temperature.

5. A magnetic data eraser, comprising:
a mounting and immobilizing tray that has a mounting fixture which is aligned in a predetermined direction, wherein the mounting fixture is inclined at an angle of 60±10 degrees to the horizontal, and has a section of a predetermined length at a front end and a section of a predetermined length at a back end of the mounting and immobilizing tray that limit a position that is configured for erasure in order to avoid the influence of magnetic field reductions at ends of a magnetizing coil;
a magnetizer that is encircled by the magnetizing coil, said magnetizer having a hollow portion into which the mounting and immobilizing tray is inserted; and
a controller that is configured to cause an electric current to flow as an excitation current through the magnetizing coil, said excitation current generating a magnetic field to erase data stored in the magnetic recording medium.

6. A magnetic data eraser, comprising:
a mounting and immobilizing tray that has a plurality of mounting fixtures which are aligned in a predetermined direction, each of the mounting fixtures being inclined at an angle of 60±10 degrees to the horizontal, and has a section of a predetermined length at front end and a section of a predetermined length at a back end of the mounting and immobilizing tray to limit a position that is configured for erasure in order to avoid influence of magnetic field reductions at ends of a magnetizing coil;
a magnetizer that is encircled by the magnetizing coil, said magnetizer having a hollow portion into which the mounting and immobilizing tray is inserted; and
a controller that is configured to cause an electric current to flow as an excitation current through the magnetizing coil, said excitation current generating a magnetic field to erase data stored in the magnetic recording medium.

* * * * *